Oct. 2, 1956 K. M. ELLIOTT 2,765,282
METHOD FOR THE REGENERATION OF ADSORBENT CONTACT MATERIAL
Filed March 18, 1952 2 Sheets-Sheet 1
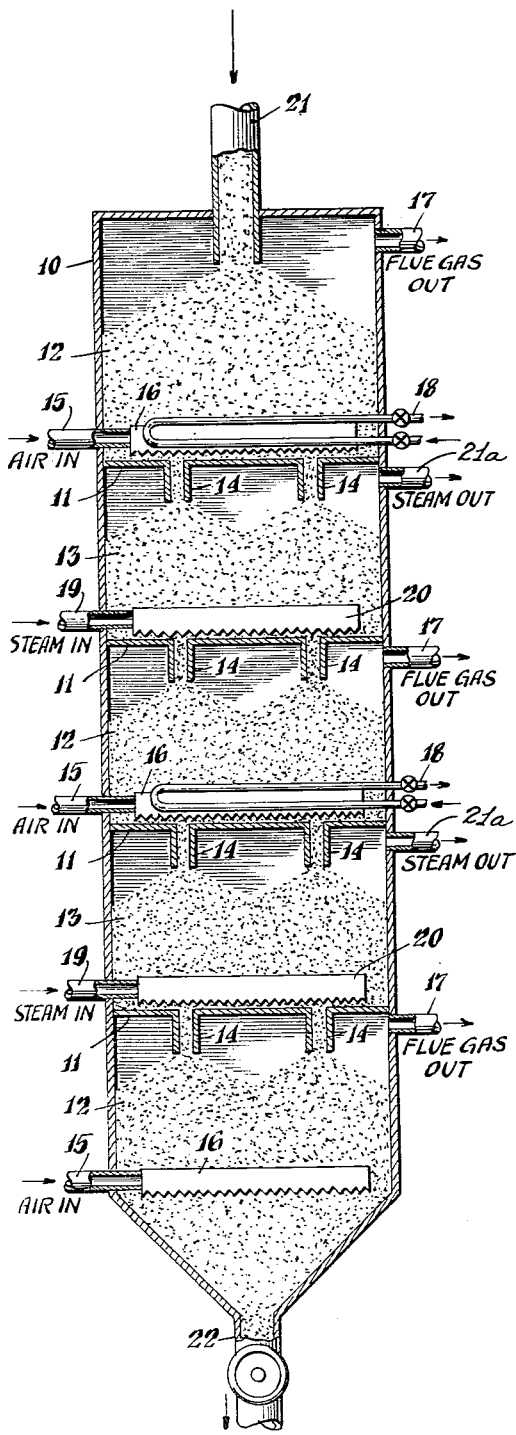
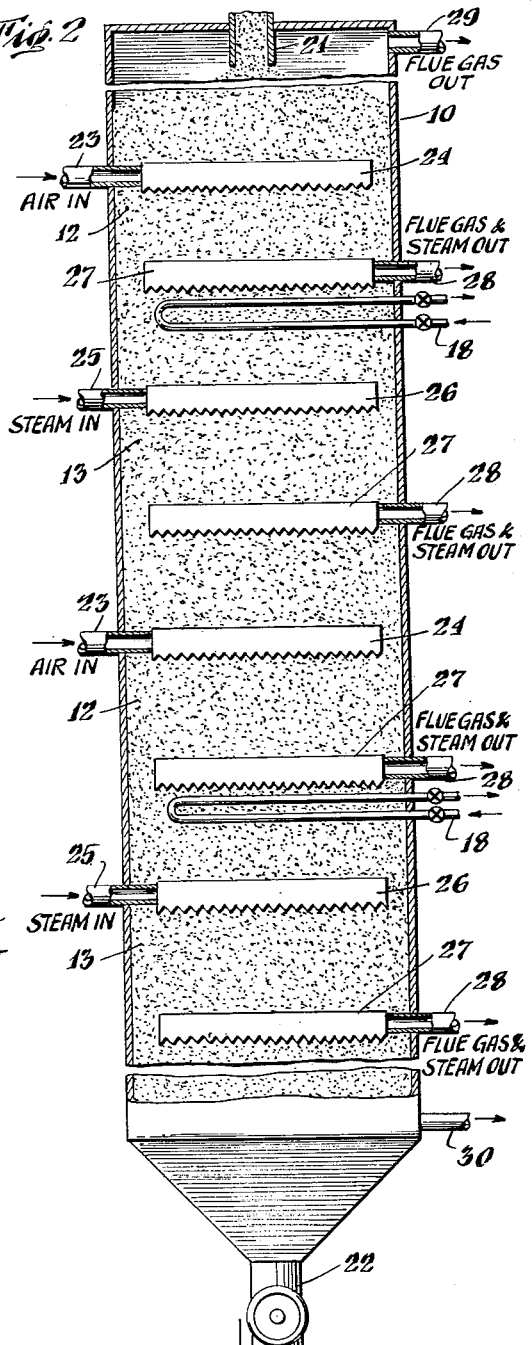
INVENTOR.
Kenneth M. Elliott
BY Andrew L. Gabouriault
AGENT

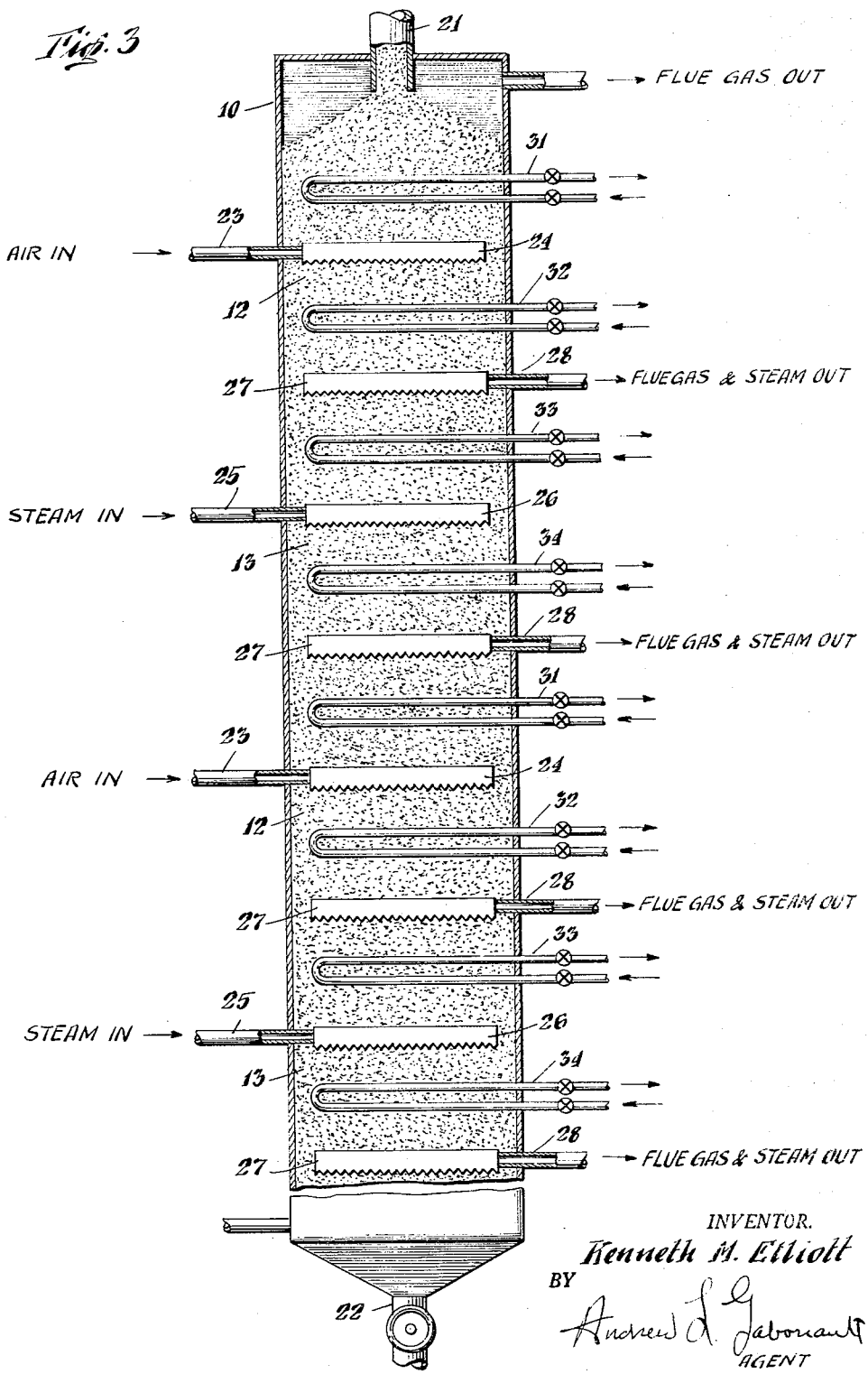

United States Patent Office 2,765,282
Patented Oct. 2, 1956

2,765,282

METHOD FOR THE REGENERATION OF ADSORBENT CONTACT MATERIAL

Kenneth M. Elliott, Woodbury, N. J., assignor to Socony Mobil Oil Company, Inc., a corporation of New York Application March 18, 1952, Serial No. 277,259

10 Claims. (Cl. 252—418)

This invention has to do with a method for the continuous regeneration of hydratable adsorbent contact material, bearing a carbonaceous contaminant deposit, by burning. It is more particularly concerned with the control of the temperature of the burning so as to avoid damage of the contact material by overheating.

Typical of the processes to which this inveniton may be applied is the catalytic conversion of a high boiling hydrocarbon charge to a lower boiling product in the presence of a granular adsorbent catalytic solid. The catalytic solid is passed through successive zones or vessels in the first of which it is contacted with the high boiling hydrocarbon charge at temperatures of 800° F. and upwards to effect the desired conversion to lower boiling products which may contain high percentages of gasoline, and in the second of which carbonaceous contaminants deposited on the catalyst in the first zone are burned off by means of an oxygen-containing gas to recondition the catalyst for reuse in the conversion zone. Other exemplary processes are the catalytic cracking, hydrogenation, dehydrogenation or polymerization of hydrocarbons of low boiling range, catalytic treating, reforming or desulfurization of gasolines and naphthas, catalytic partial oxidation and similar conversions of hydrocarbon materials and processes for the removal of small amounts of impurities from liquid hydrocarbons by adsorption on adsorptive solids.

Broadly, the invention applies to any regeneration processes in which the contact material passes substantially straight through the regeneration zone in a substantially unilateral direction. Preferably the contact material flows through the regeneration zone as a downwardly gravitating, substantially compact mass. But less preferred forms may include processes wherein the contact material is suspended in a gas and flows upwardly or downwardly through the regeneration zone in a substantially unilateral direction.

In processes wherein the contact material is in the nature of an adsorbent conversion catalyst, it may partake of the nature of fuller's earth or other natural or synthetic clays, bauxite, activated alumina or synthetic associations of silica, alumina or silica and alumina to which other substances, such as certain metallic oxides may be added in small amounts for specific purposes. In processes wherein the contact material is an adsorbent capable of use for purifying liquid hydrocarbons it may partake of the nature of fuller's earth, bauxite, bentonite and bone char, charcoal, magnesium silicate, heat and acid activated kaolin, activated carbon, and synthetic silica or alumina or silica-alumina gel adsorbents. In any case the contact material should have an appreciable heat of hydration and be of a type which is not permanently damaged by contact with steam or hydration.

The contact material must be a "hydratable adsorbent." This term is used in describing and claiming this invention to mean an adsorbent contact material capable of releasing substantial quantities of water with an adsorption of heat at regeneration temperature levels, that is about 850–1400° F., when heated thereto in an atmosphere of low water partial pressure, and of taking up substantial amounts of water at similar temperature levels, and particularly at about 850–1050° F., and releasing heat when subjected to an atmosphere in which the water partial pressure is high, for example 225–760 mm. at one atmosphere total pressure.

Where the adsorbent contact material is passed through the regeneration zone as a substantially compact bed, the contact material should be of palpable particulate form as distinguished from finely divided powders and the term "granular" as used herein in describing and claiming this invention should be understood to include any contact material of this form. Contact material for compact mass operations should generally be within the range about 3 to 100 mesh and preferably 4 to 20 mesh by Tyler standard screen analysis. Where the contact material is suspended in a gas stream for the regeneration it is generally desirabel that the contact material be of smaller average size than that used in compact bed operations. Preferably the suspended contact material should be in the form of a finely divided powder.

The chief problem in the regeneration of adsorbent contact material which passes unilaterally through the regeneration zone and is therein contacted with an oxygen-containing gas to burn the contaminant deposited thereon, is the control of the temperature in the regeneration zone below the level at which the adsorbent is permanently damaged by overheating thereby reducing its efficiency for use in the cyclic system. The prior art has avoided this difficulty by passing the adsorbent contact material through alternate burning and cooling zones in the regeneration zone. The rate of admission of oxygen-containng gas to each burning zone is controlled so that only an amount of burning occurs therein sufficient to raise the temperature of the contact material leaving the burning zone to a level near but below the heat damaging level. The contact material is then cooled in the cooling zone next below to remove the heat transferred to its by the combustion of the contaminant. This burning and cooling is continued until the amount of contaminant on the contact material is reduced to the desired level. The cooling is accomplished in some systems by indirect heat exchange with a suitable cooling fluid circulated in heat transfer tubes. There are several difficulties with this system. The heat transfer tubes are expensive and the elimination of most of them would materially reduce the cost of the regeneration vessel. Also, since the regenerator is designed so that the exit contact material temperature from each burning zone is very near the heat damaging temperature, any channeling of the oxygen-containing gas through the contact material results in a portion of the contact material exceeding the heat damaging temperature. Further, there is a problem where the flow rate of the oxygen-containing gas is such that all the oxygen is not consumed in burning the contaminant. This results in burning of combustible portions of the flue gas in the flue gas withdrawal channels which causes damage to these channels. This phenomenon is generally termed "after-burning."

The prior art remedies some of these difficulties by substituting cooling by direct heat exchange with an inert cooling gas for the cooling by the indirect heat exchange in certain operations. This makes possible the elimination of most or all of the heat transfer tubes and, by providing a common outlet for the cooling gas and flue gas, the afterburning problem is removed since after-burning does not occur if the flue gas is diluted sufficiently with an inert gas. Steam is one inert gas which the prior art proposes as a cooling gas. While steam is a highly desirable cooling gas because of its low cost and ready availability, there is one difficulty in its use which the prior art does not recognize or cure. That is that the steam will hydrate the adsorbent contact material and release a certain amount of hydration heat. Since the contact material leaves the burning zone at a temperature very near the heat damaging level, the release of this hydration heat near the entrance ends of the cooling zones will be enough to elevate the temperature of the contact material to a level above the heat-damaging level.

A major object of this invention is to provide a method for the regeneration of contact material which overcomes the above-described difficulties.

Another object of this invention is to provide a method for the regeneration of an adsorbent contact material without overheating the contact material to a temperature above the heat damaging level.

Another object of this invention is to provide, in a process for the regeneration of adsorbent contact material wherein the contact material is passed through alternate burning and cooling zones, a method for utilizing direct heat exchange with steam for cooling the contact material without permanently damaging the contact material due to overheating.

This invention provides a method for the regeneration of an hydratable adsorbent contact material bearing a carbonaceous contaminant deposit wherein the contact material is passed through alternate burning and hydration zones within a confined regeneration zone. The contact material is contacted with a combustion supporting gas in the burning zones to burn the contaminant and dehydrate the contact material. Steam is passed through the hydration zones to hydrate the contact material, so that the contact material is alternately dehydrated and hydrated as it passes through the regeneration zone. The contact material is cooled to temperatures below the heat damaging level in the regeneration zone by positive extraction of heat. At least a portion of this heat extraction is effected by indirect heat exchange with a cooling fluid at locations within the regeneration zone, along the path of flow of the contact material, suitable to prevent overheating in the hydration zones. This indirect heat exchange is effected by passing a suitable cooling fluid in indirect heat transfer relationship with adsorbent contact material along at least a portion of a plurality of vertically spaced apart sections of the bed in the regeneration zone. Each of these sections comprises a portion of the bed corresponding to the lower section of a burning zone and the upper section of the following hydration zone. The amount of heat removed by indirect heat exchange is at least equal to the heat of hydration of the contact material. All of the heat produced by the burning of the contaminant, exclusive of heat losses through the walls of the regeneration zone, may be removed by indirect heat exchange, if desired, with the steam only acting to hydrate the contact material or only the heat of hydration may be removed by indirect heat exchange with substantially all of the excess heat of combustion being removed by the steam.

This invention will be best understood by referring to the attached drawings of which, Figure 1 is an elevational view, partially in section, of one form of apparatus suitable for the method of this invention, Figure 2 is an elevational view, partially in section, of a second form of apparatus suitable for the method of this invention, and Figure 3 is an elevational view, partially in section, of a third form of apparatus suitable for the method of this invention.

All of these drawings are highly diagrammatic in form and like parts in all bear like numerals.

Turning now to Figure 1, there is shown therein a confined regeneration vessel 10. A plurality of transverse partitions 11 extend laterally across vessel 10 at a plurality of spaced apart levels so as to define alternate superimposed burning zones 12 and cooling or hydration zones 13. A plurality of conduits 14 extend substantially vertically downwardly from each of partitions 11 and terminate within the upper section of the burning or cooling zone therebelow. An inlet conduit 15 for oxygen-containing gas extends into the lower section of each of burning zones 12 and has a substantially horizontal distributor channel 16 connected to its inner end. Flue gas exit conduits 17 extend from the upper section of each burning zone. Cooling coils 18 are provided near the exit end of each of the burning zones 12 which are superimposed on a cooling zone 13. A steam inlet conduit 19 extends into the lower section of each of cooling zones 13 and connects into a substantially horizontal distributor channel 20. Both channels 16 and 20 are open on their bottoms. Other forms of distributors than those shown may be used. For example, conduits 15 and 19 could extend almost across vessel 10 and have openings along their length which communicate with a plurality of channels like 16 and 20 extending perpendicularly therefrom. A steam outlet conduit 21a is provided at the upper section of each of cooling zones 13.

In operation, hydratable adsorbent granular contact material passes through the regeneration zone 10 as a downwardly gravitating, substantially compact bed of granular contact material. Granular, contaminant-bearing, adsorbent contact material is supplied to the upper section of the upper burning zone 12 by passage 21 at a temperature suitable to initiate contaminant combustion. An oxygen-containing gas, such as air, is supplied to the lower section of each of burning zones 12 at a rate controlled to effect an amount of burning of the contaminant on the adsorbent therein sufficient to heat the contact material to a temperature level near but below the heat damaging level. The oxygen containing gas passes upwardly through the contact material in each of the burning zones to effect this burning. Flue gas is removed from the upper section of each of zones 12 through conduits 17. A suitable cooling fluid, such as steam or water, is circulated through cooling coils 18 at a rate sufficient to remove a quantity of heat from the contact material equal at least to its heat of hydration but not substantially greater than the heat of hydration. Steam is passed upwardly through each of cooling zones 13 to remove a major portion of the heat produced in the burning zone thereabove. This quantity of heat will be equal to the heat of combustion of the contact material minus the heat of hydration removed by cooling coils 18 and minus the heat losses through the walls of vessel 10. The contact material is dehydrated by the burning in zones 12 and hydrated again by the steam in zones 13. The alternate burning and cooling is continued until the amount of carbonaceous contaminant on the contact material is reduced to the desired level. The contact material is then removed from the regeneration zone via conduit 22.

It is apparent that by this method the number and size of the cooling coils needed in the regeneration zone is substantially reduced since the steam does the major portion of the cooling. However, by providing the cooling coils 18 the temperature of the contact material is reduced near the exit ends of zones 13 by an amount equivalent to the heat of hydration. When the contact material first enters cooling zones 13 it is immediately hydrated by the steam therein and an amount of heat released sufficient to raise the temperature by the amount cooling coils 18 reduced it. This does not result in overheating of the contact material, however, as it would if cooling coils 18 were not used. Another advantage is that the steam produced by the dehydration of the adsorbent has the tendency to prevent air channeling through the adsorbent in the burning zones. Since the steam from the dehydration is removed with the flue gas through conduits 17 it tends to prevent after-burning of the flue gas by dilution. By hydrating the adsorbent contact material in the cooling zone and then dehydrating in the burning zone a "heat cushion" may be provided against overheating of the contact material. The design of the burning zone may be made such that in normal operations only a partial dehydration of the contact material occurs. Then if any excess burning should occur it will only tend to further dehydrate the contact material and not overheat it, within limits of course.

Figure 2 illustrates an apparatus, similar in form to that of Figure 1 with the exception that cooling coils 18 are located near the entrance end of cooling or dehydrating zones 13 rather than near the exit ends of burning zones 12 and the air and steam are supplied to the center of their respective zones rather than the lower section thereof. Hydratable adsorbent contact material passes through zone 10 as a downwardly gravitating substantially compact bed through a series of alternate superimposed burning zones 12 and cooling zones 13. The contaminant-bearing material is supplied to the upper section of the bed in the upper burning zone through passage 21 at a temperature suitable for the initiation of contaminant combustion and regenerated adsorbent contact material is removed from the lower section of the bed through passage 22. An oxygen-containing gas is supplied centrally and separately to each of burning zones 12 through passages 23 and distributors 24 at a rate sufficient to effect a portion of contaminant combustion in each burning zone which will release an amount of heat sufficient to raise the temperature of the contact material leaving the zone to a level near but below the heat damaging level. A portion of this oxygen-containing gas passes upwardly through the adsorbent in the upper portion of each burning zone while the remainder passes downwardly through the adsorbent in the lower portion of the burning zone. Steam is introduced centrally to each cooling zone through conduits 25 and distributors 26, a portion thereof flowing upwardly through the upper section of the zone while the remainder flows downwardly through the lower section. A cooling fluid is circulated through cooling coils 18 to remove an amount of heat at least equal to the heat of hydration but not substantially greater than that heat. The steam removes the remainder of the heat produced in the burning zones except for losses through the walls of vessel 10. Steam and flue gas are removed together through distributors 27 and conduits 28 which are placed between each burning and cooling zone. This effects a substantial dilution of the flue gas by steam and thereby prevents afterburning of the withdrawn flue gas. Conduit 29 is provided for the withdrawal of flue gas from the upper end of the upper burning zone and conduit 30 for the withdrawal of steam or flue gas plus steam from the lower end of the lower zone. The adsorbent contact material is alternately dehydrated and hydrated as in the method of Figure 1 with the attendant advantages described in connection with that figure.

Figure 3 illustrates a modification of the method of this invention in which the steam is used only to hydrate the adsorbent contact material and removes substantially none of the heat produced in the burning zones, all of this heat being removed by indirect heat exchange. The construction of the apparatus of Figure 3 is the same as that of Figure 2 with the exception of the arrangement of the cooling tubes. Cooling tubes 31 are provided in the upper section of each burning zone 12 while cooling tubes 32 are supplied in the lower section of each of zones 12. Zones 13 which here act as only hydration zones have cooling tubes 33 in their upper sections and cooling tubes 34 in their lower sections. Contact material passes through the regeneration zone 10 and oxygen-containing, combustion supporting gas and steam are supplied and withdrawn from their respective zones in the same manner as in Figure 2. The steam is supplied in an amount sufficient to effect substantial hydration of the adsorbent contact material but insufficient to effect substantial cooling of the adsorbent. Cooling fluid is circulated through cooling tubes 31 and 32 in the burning zone at a rate sufficient to remove from the zones an amount of heat substantially equal to the heat of combustion less the heat of hydration and heat losses through the walls of vessel 10. The contact material is successively dehydrated in burning zone 12 and hydrated in hydration zones 13. The heat of hydration is removed by indirect heat exchange with a cooling fluid circulated in cooling coils 33 and 34.

The various portions of the improved method of this invention may take other forms than those shown in the attached drawings. As has previously been stated the contact material may be passed upwardly through the regeneration zone rather than downwardly therethrough. The downwardly gravitating compact mass type of operation is preferable, however. The first zone to which the contact material is supplied may be either a burning or a cooling or hydration zone. However, unless the contact material is supplied at a temperature very near the heat damaging level it is generally desirable that the first zone be a burning zone. Likewise the last zone may be either a burning or a cooling zone. While the examples given have shown either removing substantially only the heat of hydration by indirect heat exchange while the remainder is removed by steam or removing all the heat produced by indirect heat exchange, with substantially no heat removed by the steam, it may be desirable in some processes to remove a quantity of heat intermediate between these two extremes by the two methods. At least the heat of hydration should always be removed by indirect heat exchange however. It is generally preferable, in this invention, to do the major portion of the cooling with the steam and remove only the heat of hydration by indirect heat exchange since this presents a considerable saving of heat transfer tubes. It is also preferable when this is done that the heat of hydration be removed in the lower section of the burning zones rather than the upper section of the cooling zones since this method provides greater security against the contact material overheating due to the heat of hydration.

The temperature at which any given contact material is permanently damaged by heat, i. e., the heat damaging level, varies with the particular contact material. The heat damaging level is about 1200° F. for natural clay catalyst, about 1300° F. to 1400° F. for bauxites and about 1400° F. to 1500° F. for synthetic gel type catalysts. The heat of hydration for natural clay catalyst is usually quite high generally about 30 to 60 British thermal units per pound depending on the temperature of hydration. Synthetic catalysts have much lower heats of hydration and are usually more stable to steam. Generally the heat of hydration of a synthetic catalyst will be about 5 to 10 British thermal units per pound. The most suitable clay catalyst for use in this invention is montmorillonite and the most suitable synthetic catalyst is silica-alumina gel.

Contact material should be supplied to each burning zone at a temperature within the range about 700° F. to 900° F. to initiate contaminant combustion. Generally the lower the ratio of hydrogen to carbon in the contaminant the higher the temperature of introduction must be to initiate the contaminant combustion.

Where air is used as the oxygen-containing gas it should generally be supplied to the burning zones at temperatures within the range about 80° F. to 900° F. Steam should be supplied to the cooling or hydration zone at temperatures within the range about 212° F. to 800° F.

As an example of the operation of this invention, the regeneration of a clay type catalyst will be discussed. Where the steam does a major portion of the cooling and the heat of hydration is removed in the lower section of the burning zones as shown in Figure 1, the clay is supplied to the upper burning zone at a temperature of about 800° F. while air is supplied to the lower section of each burning zone at a temperature of about 800° F. The contact material is heated to a temperature of about 1150° F. by the burning. If the heat of hydration is assumed to be sufficient to raise the temperature of the clay 100° F. this amount of heat is removed by indirect heat exchange so that the clay leaves the burning zone at about 1050° F. Upon first contacting steam in the upper section of the cooling zone therebelow the contact material is immediately hydrated so that its temperature again rises to about 1150° F. Steam is supplied to the cooling zones at about 400° F. and cools the contact material therein to about 900° F. at which temperature it may be supplied to the next burning zone. This alternate burning and cooling continues until the clay is regenerated. The cooling in successively lower cooling zones may be adjusted so that the clay inlet temperature to successively lower burning zones is successively higher since as the contaminant content of the contact material decreases, progressively higher temperatures are needed to initiate combustion.

This invention should be understood to cover all changes and modifications of the examples of the invention herein chosen for purposes of disclosure which do not constitute departures from the spirit and scope of the invention.

What is claimed is:

1. A method for the regeneration of hydratable adsorbent contact material bearing a carbonaceous contaminant deposit, which comprises: passing the contact material through a plurality of burning zones and a plurality of hydration zones alternately arranged within a confined regeneration zone, contacting the contact material with a combustion supporting gas in each of the burning zones to burn off the carbonaceous contaminants and dehydrate the contact material, contacting the contact material with steam in each of the hydration zones to hydrate the contact material, whereby the contact material is alternately dehydrated and hydrated as it passes through the alternately arranged burning and hydration zones within the regeneration zone, removing sufficient heat from the contact material as it travels through the regeneration zone to maintain the temperature of the contact material below the level at which it will be permanently damaged by heat, and effecting at least a portion of this heat removal at least equal to the heat of hydration by indirect heat exchange with a cooling fluid at a plurality of locations along the path of flow of the contact material through the regeneration zone suitable to prevent overheating of the contact material in the hydration zones.

2. A method for the continuous regeneration of a hydratable adsorbent bearing a carbonaceous contaminant deposit, which comprises: passing the adsorbent through a plurality of burning zones and a plurality of hydration zones alternately arranged within a confined regeneration zone as a downwardly gravitating, substantially compact bed, alternately contacting said bed along its path of travel through said regeneration zone with a combustion supporting gas and with steam, the combustion supporting gas burning off the carbonaceous contaminants and dehydrating the adsorbent and the steam hydrating the adsorbent so that the adsorbent is alternately dehydrated and hydrated as it passes through the alternately arranged burning and hydration zones within the regeneration zone, removing sufficient heat from the adsorbent as it travels through the regeneration zone to maintain the temperature of the adsorbent below the heat damaging level by heat exchange with at least one cooling fluid, effecting a portion of said heat removal at least equal in amount to the heat of hydration by passing a suitable cooling fluid in indirect heat transfer relationship with the adsorbent along at least a portion of a plurality of vertically spaced-apart vertical sections of the bed in said regeneration zone, each of said sections comprising a portion of the bed corresponding to the lower section of a burning zone and the upper section of the following hydration zone, so that overheating of the adsorbent in the hydration zones is avoided.

3. A method for the regeneration of a hydratable adsorbent bearing a carbonaceous contaminant deposit, which comprises: passing the adsorbent through alternate burning and steaming zones, passing steam into contact with the adsorbent in the steaming zones in an amount sufficient to effect substantial hydration of the adsorbent but insufficient to effect substantial cooling of the adsorbent, passing a combustion supporting gas into contact with the adsorbent in said burning zones to effect burning of the contaminant deposit, and removing at least a major portion of the heat of combustion from the adsorbent by indirect heat exchange with a cooling fluid at locations such as to prevent overheating of the contact material to the heat damaging level in both the burning and steaming zones.

4. A method for the regeneration of hydratable adsorbent contact material bearing a carbonaceous contaminant deposit, which comprises: passing the contact material through alternate burning and hydration zones, contacting the contact material with an oxygen-containing gas in the burning zones to burn the carbonaceous contaminants and dehydrate the contact material, contacting the contact material with steam in the hydration zones to hydrate the contact material thereby effecting alternate dehydration and hydration of the contact material, removing at least a major portion of the heat of combustion from the contact material in the burning zones by indirect heat exchange in the burning zones with a cooling fluid, thereby maintaining the temperature of the contact material therein below the heat damaging level, and removing the heat of hydration from the contact material in the hydration zones by indirect heat exchange in the hydration zones with a cooling fluid thereby maintaining the temperature therein below the heat damaging level.

5. A method for the continuous regeneration of a granular hydratable adsorbent bearing a carbonaceous contaminant deposit, which comprises: passing the granular adsorbent through alternate burning and cooling zones within a confined regeneration zone, contacting the adsorbent with an oxygen-containing gas in the burning zones to burn the carbonaceous contaminant and dehydrate the adsorbent, removing an amount of heat at least equal to the heat of hydration from the adsorbent by means of a cooling fluid passed in indirect heat exchange relationship with the adsorbent along at least a portion of a plurality of vertically spaced apart vertical sections of the bed in said regeneration zone, each of said sections comprising a portion of the bed corresponding to the lower section of a burning zone and the upper section of the following cooling zone to prevent overheating of the adsorbent in the cooling zones, removing at least a major portion of the remainder of the excess heat of the burning by passing steam through the cooling zones, the amount of heat removed by the steam being a substantial portion of the heat produced by the burning, whereby the adsorbent is alternately dehydrated and hydrated as it passes through the regeneration zone.

6. A method for the continuous regeneration of a hydratable granular adsorbent bearing a carbonaceous contaminant deposit, which comprises: passing the adsorbent through alternate burning and hydration zones within a confined regeneration zone, passing an oxygen-containing gas through the burning zones to burn the carbonaceous contaminant and dehydrate the adsorbent, passing steam through said hydration zones to hydrate the adsorbent thereby effecting alternate dehydration and hydration of the adsorbent in burning and hydration zones, cooling the adsorbent near the exit ends of most of said burning zones by indirect heat exchange with a cooling fluid and reducing the heat carried by the adsorbent thereby to a level below the heat damaging level by an amount at least equal to the heat of hydration of the contact material released in the succeeding hydration zone and removing at least a major portion of the remainder of the heat produced in the burning zones not removed by indirect heat exchange by means of direct heat exchange with the steam in the hydration zones.

7. A method for the continuous regeneration of a hydratable granular adsorbent bearing a carbonaceous contaminant deposit, which comprises: passing the adsorbent through a series of alternate burning and cooling zones, contacting the adsorbent with an oxygen-containing gas in said burning zones to burn the carbonaceous contaminants and dehydrate the adsorbent, cooling the adsorbent at levels near the entrance end of said cooling zones by indirect heat exchange with a cooling fluid and removing an amount of heat from the adsorbent thereby at least equal to the hydration heat of the adsorbent, and passing steam through each of said cooling zones to hydrate the adsorbent and remove from the adsorbent substantially all of the remainder of the heat produced in the burning zones over that removed by indirect heat exchange.

8. A method for the continuous regeneration of a hydratable granular adsorbent bearing a carbonaceous contaminant deposit, which comprises: gravitating the adsorbent as a substantially compact bed downwardly through a series of superimposed alternate burning and cooling zones within a confined regeneration zone, supplying contaminant bearing adsorbent to the upper section of said bed at a temperature suitable to initiate burning of the contaminant, supplying an oxygen-containing gas to the lower section of each of said burning zones at a rate controlled to effect an amount of burning of the contaminant on the adsorbent therein sufficient to heat the contact material therein to a temperature level near but below the heat damaging level, passing the oxygen-containing gas upwardly through said burning zones to effect said burning, removing flue gas from the upper section of each of said burning zones, removing a quantity of heat from the adsorbent in the lower section of each of said burning zones equal to at least the heat of hydration of the adsorbent, supplying steam to the lower section of each of said cooling zones, passing the steam upwardly through each of said cooling zones to remove the remainder of the heat produced in said burning zones and to hydrate the adsorbent whereby the adsorbent will be alternately dehydrated in the burning zones and hydrated in the cooling zones, removing steam from the upper section of each cooling zone and removing regenerated adsorbent from the lower section of said bed.

9. A method for the continuous regeneration of a hydratable granular adsorbent bearing a carbonaceous contaminant deposit, which comprises: gravitating adsorbent as a substantially compact bed downwardly through a series of alternate burning and cooling zones, supplying contaminant bearing adsorbent at a temperature suitable to initiate combustion of the contaminant deposit to the supper section of the upper burning zone, supplying an oxygen-containing gas separately and centrally to each of said burning zones at a rate controlled to burn a portion of the contaminant in any one burning zone suitable to heat the adsorbent therein to a temperature level near but below the heat damaging level, passing a portion of the oxygen-containing gas upwardly through the adsorbent in the upper portion of each burning zone and passing the remainder of the oxygen-containing gas downwardly through the adsorbent in the lower portion of each burning zone, removing an amount of heat from the adsorbent in the upper section of each cooling zone by indirect heat exchange with a cooling fluid equal to at least the heat of hydration of the contact material, passing steam centrally into each of said cooling zones, passing a portion of the steam upwardly through the adsorbent in the upper portion of the cooling zone and the remainder of the steam downwardly through the adsorbent in the lower portion of the cooling zone thereby effecting removal of an amount of heat from the adsorbent in each cooling zone substantially equal to the heat produced in the burning zone less the heat removed by indirect heat exchange and effecting hydration of the adsorbent in each cooling zone, removing flue gas and steam together from the bed from the upper end of each burning zone and the lower end of the cooling zone thereabove and from the lower end of each burning zone and the upper end of the cooling zone therebelow except the upper end of the upper zone and the lower end of the lower zone, and removing regenerated adsorbent from the lower end of the lower zone.

10. A method for the continuous regeneration of a hydratable granular adsorbent bearing a carbonaceous contaminant deposit, which comprises: gravitating the contaminant-bearing adsorbent downwardly through a series of alternate superimposed burning and hydration zones as a substantially compact bed, supplying contaminant-bearing adsorbent at a temperature suitable to initiate contaminant combustion to the upper section of said bed in the upper section of the upper burning zone, supplying an oxygen-containing gas centrally to each of the burning zones at a rate suitable to effect burning of a portion of the contaminant on the adsorbent in each burning zone and thereby release an amount of heat sufficient to raise the temperature of the adsorbent in each burning zone to a level near but not below the heat damaging level, passing a portion of the oxygen-containing gas upwardly through the adsorbent in the upper portion of each burning zone and the remainder of the oxygen-containing gas downwardly through the adsorbent in the lower portion of each burning zone to effect the burning and dehydrate the adsorbent, removing an amount of heat from adsorbent equal to the heat produced by the burning less the heat required to dehydrate the adsorbent by means of indirect heat exchange with a cooling fluid in the upper and lower sections of each burning zone, supplying steam centrally to each hydrating zone and passing a portion of the steam upwardly through the adsorbent in the upper portion of each hydrating zone and the remainder of the steam downwardly through the adsorbent in the lower portion of each hydrating zone to effect hydration of the adsorbent, removing the heat of hydration from the adsorbent in each hydrating zone by means of indirect heat exchange with a suitable cooling fluid in the upper and lower sections of each hydrating zone, removing steam and flue gas together from said bed at levels between each burning and hydrating zone and removing regenerated adsorbent from the lower section of said bed.

References Cited in the file of this patent

UNITED STATES PATENTS

| | | |
|---|---|---|
| 2,436,780 | Simpson | Feb. 24, 1948 |
| 2,458,434 | Simpson | Jan. 4, 1949 |
| 2,526,701 | Shirk | Oct. 24, 1950 |
| 2,592,121 | Crowley | Apr. 8, 1952 |
| 2,616,858 | Gilette et al. | Nov. 4, 1952 |

FOREIGN PATENTS

| | | |
|---|---|---|
| 612,423 | Great Britain | Nov. 12, 1948 |